US012557743B1

(12) United States Patent
Khmelev et al.

(10) Patent No.: US 12,557,743 B1
(45) Date of Patent: Feb. 24, 2026

(54) SYSTEMS AND METHODS FOR SPRINKLER CONTROL BASED ON ENVIRONMENTAL CONDITIONS

(71) Applicant: United Services Automobile Association (USAA), San Antonio, TX (US)

(72) Inventors: Yevgeniy Viatcheslavovich Khmelev, San Antonio, TX (US); Justin Royell Nash, Little Elm, TX (US); Bradly Jay Billman, Celina, TX (US); Austin Ray Keeton, The Colony, TX (US); Gideon Bowie Luck, Wylie, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 766 days.

(21) Appl. No.: 17/848,035

(22) Filed: Jun. 23, 2022

Related U.S. Application Data

(60) Provisional application No. 63/216,378, filed on Jun. 29, 2021.

(51) Int. Cl.
 *A01G 25/16* (2006.01)
 *G06Q 40/08* (2012.01)

(52) U.S. Cl.
 CPC ........... *A01G 25/165* (2013.01); *G06Q 40/08* (2013.01)

(58) Field of Classification Search
 CPC ............................ A01G 25/165; G06Q 40/08
 See application file for complete search history.

(56) References Cited

U.S. PATENT DOCUMENTS

| | | | | |
|---|---|---|---|---|
| 10,102,585 B1* | 10/2018 | Bryant | ................ | H04L 12/2823 |
| 10,514,669 B1* | 12/2019 | Call | ......................... | E03B 7/071 |
| 10,602,682 B1* | 3/2020 | Wardle | ................. | A01G 25/165 |
| 2009/0099701 A1* | 4/2009 | Li | ........................... | A01G 25/16 |
| | | | | 700/284 |
| 2012/0286062 A1* | 11/2012 | Sicotte | ................... | A62C 37/00 |
| | | | | 239/71 |
| 2013/0035774 A1* | 2/2013 | Warren | ................ | A01G 25/167 |
| | | | | 700/90 |
| 2013/0310992 A1* | 11/2013 | Larsen | ................... | A01G 25/16 |
| | | | | 700/284 |
| 2017/0147011 A1* | 5/2017 | Klein | ................... | A01G 25/162 |
| 2020/0383284 A1* | 12/2020 | Larsen | ................... | G01W 1/14 |
| 2021/0141400 A1* | 5/2021 | Klein | ................... | G05D 7/0635 |

* cited by examiner

*Primary Examiner* — Robert E Fennema
*Assistant Examiner* — Magdalena I Kossek
(74) *Attorney, Agent, or Firm* — Fletcher Yoder, P.C.

(57) ABSTRACT

The present disclosure is generally directed toward a system for sprinkler system control based on environmental conditions. The system may include one or more processors and memory storing instructions executable by the one or more processors to cause the one or more processors to determine a change in an environmental condition for an area. The instructions are also executable by the one or more processors to cause the one or more processors to identify multiple distinct sprinkler systems associated with multiple distinct properties in the area and transmit control instructions to the multiple distinct sprinkler systems associated with the multiple distinct properties in the area in response to the change in the environmental condition.

20 Claims, 4 Drawing Sheets

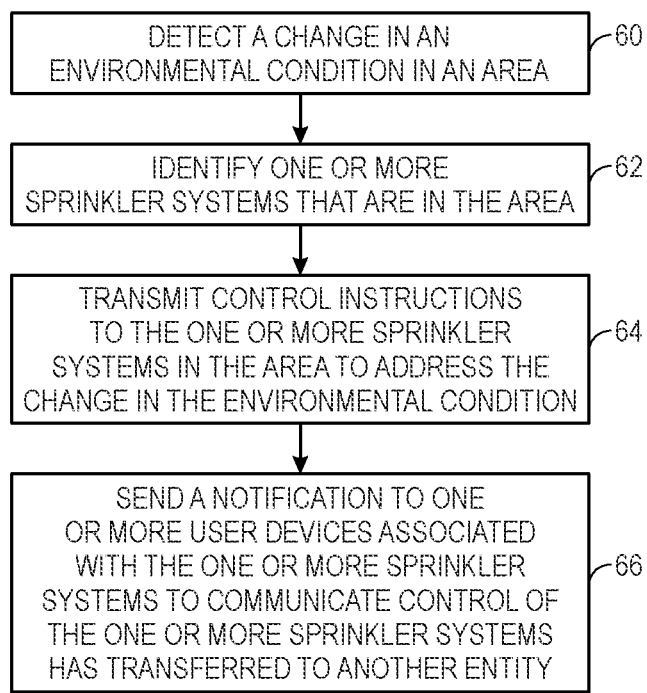

DETECT A CHANGE IN AN
ENVIRONMENTAL CONDITION IN AN AREA ⌐60

IDENTIFY ONE OR MORE
SPRINKLER SYSTEMS THAT ARE IN THE AREA ⌐62

TRANSMIT CONTROL INSTRUCTIONS
TO THE ONE OR MORE SPRINKLER
SYSTEMS IN THE AREA TO ADDRESS THE
CHANGE IN THE ENVIRONMENTAL CONDITION ⌐64

SEND A NOTIFICATION TO ONE
OR MORE USER DEVICES ASSOCIATED
WITH THE ONE OR MORE SPRINKLER
SYSTEMS TO COMMUNICATE CONTROL OF
THE ONE OR MORE SPRINKLER SYSTEMS
HAS TRANSFERRED TO ANOTHER ENTITY ⌐66

*FIG. 5*

SYSTEMS AND METHODS FOR SPRINKLER CONTROL BASED ON ENVIRONMENTAL CONDITIONS

CROSS-REFERENCE TO RELATED APPLICATION

This application claims priority to and the benefit of U.S. Provisional Application No. 63/216,378, entitled "SYSTEMS AND METHODS FOR SPRINKLER CONTROL BASED ON ENVIRONMENTAL CONDITIONS," filed Jun. 29, 2021, which is hereby incorporated by reference in its entirety for all purposes.

BACKGROUND

The present disclosure relates generally to systems and methods for controlling sprinkler system activation based on environmental conditions.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Lawn maintenance of a property (e.g. watering of grass, application of fertilizer) is generally performed through an in-person setting of a sprinkler system or application of fertilizer. For example, a property owner, in response to certain environmental conditions, may manually turn on and/or shut off sprinkler valves and/or may set a sprinkler controller to turn on and/or shut off the sprinkler valves for specified time periods. Accordingly, it may be difficult to adjust the sprinkler system in a timely manner in response to certain environmental conditions if the property owner is not physically present at the property. However, it is now recognized that various advantages may be gained by enabling the property owner (or other user) of the sprinkler system to remotely control or activate the sprinkler system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system includes one or more processors and memory storing instructions executable by the one or more processors to cause the one or more processors to determine a change in an environmental condition for an area. The instructions are also executable by the one or more processors to cause the one or more processors to identify multiple distinct sprinkler systems associated with multiple distinct properties in the area and transmit control instructions to the multiple distinct sprinkler systems associated with the multiple distinct properties in the area in response to the change in the environmental condition.

In an additional embodiment, a method includes receiving, at one or more processors, one or more sets of sensor data from one or more sensors, wherein the one or more sets of sensor data correspond to an environmental condition in an area. The method also includes determining, via the one or more processors, the environmental condition in the area based on the one or more sets of sensor data. The method also includes identifying, via the one or more processors, multiple distinct sprinkler systems for multiple distinct properties in the area. The method also includes determining, via the one or more processors, one or more sets of control instructions for the multiple distinct sprinkler systems based on the environmental condition in the area. The method also includes transmitting, via a transmitter, the one or more sets of control instructions to the multiple distinct sprinkler systems. The method further includes transmitting, via the transmitter, a notification to one or more user devices associated with the multiple distinct sprinkler systems.

In a further embodiment, a system includes one or more processors and a memory storing instructions executable by the one or more processors to cause the one or more processors to receive sensor data from one or more sensors associated with a sprinkler system at a property. The instructions are also executable by the one or more processors to cause the one or more processors to determine that one or more sprinkler valves of the sprinkler system at the property should be adjusted based on the sensor data. The instructions are also executable by the one or more processors to cause the one or more processors to send a notification to a user device associated with the sprinkler system in response to determining that the one or more sprinkler valves of the sprinkler system at the property should be adjusted, wherein the notification comprises a request for approval to adjust the one or more sprinkler valves. The instructions are also executable by the one or more processors to cause the one or more processors to receive approval from the user device to adjust the one or more sprinkler valves and to send a signal to adjust the one or more sprinkler valves in response to receipt of the approval.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 5 illustrates a flow diagram of a method of controlling one or more sprinkler systems, in accordance with an embodiment of the present disclosure.

DETAILED DESCRIPTION

Figure 1:
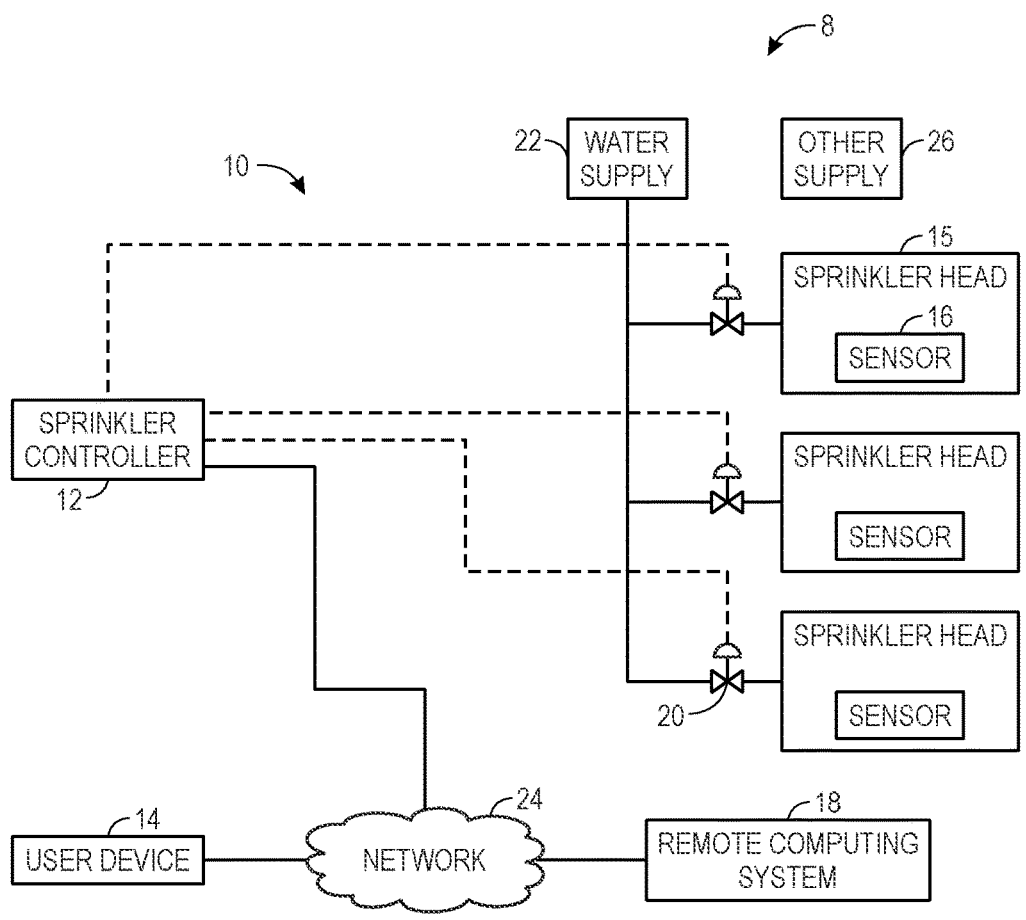
FIG. 1 illustrates a schematic diagram of a sprinkler control system, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As noted above, existing techniques to conduct lawn maintenance may rely on in-person operation of a sprinkler system. Additionally, such existing techniques are not well-suited to timely updating sprinkler system settings in response to environmental conditions, as a user would need to make multiple trips to the sprinkler system to reset the sprinkler system settings. For example, the user would have to turn off the sprinkler system during storm conditions and then physically return to the sprinkler system at a later time to reactivate or adjust settings of the sprinkler system, which may be burdensome for the user. However, it is now recognized that various advantages may be gained by enabling remote control of the sprinkler system and/or automated control of the sprinkler system based on monitoring a lawn condition via sensors of the sprinkler system.

Accordingly, the present embodiments relate to a sprinkler control system that includes one or more sprinkler sensors that provide sensor data corresponding to one or more lawn conditions to a sprinkler controller. The sensor data may include moisture data, optical data, chemical data, nutrient data, and/or any other lawn condition data. The sprinkler control system may include one or more remote devices (e.g., a user device and/or a remote computing system) that may communicate with the sprinkler controller of the sprinkler system to receive the sensor data and/or user input control settings for the sprinkler system. The sensor data may be utilized by the sprinkler controller and/or the one or more remote computing devices, such as to identify lawn conditions and/or to control sprinkler valves based on the lawn conditions. In this way, the sprinkler control system may control sprinkler activation based on the lawn conditions and/or in a manner that is appropriate for the lawn conditions.

Additionally or alternatively, the sprinkler control system may control sprinkler system settings for one or more sprinkler systems based on environmental conditions. For example, at a first time, there may be a drought condition that applies to one or more sprinkler systems within a certain geographical area (e.g., a first distinct sprinkler system for a first distinct property in the geographical area, a second distinct sprinkler system for a second distinct property in the geographical area, and so on). The remote computing system, which may be operated by a third party (e.g., a water supply entity), may gain control of the one or more sprinkler systems in the area and may communicate instructions to each of the sprinkler controllers of the one or more sprinkler systems (e.g., to restrict sprinkler activation based on the instructions). At a second time, the environmental conditions may change and the drought condition may no longer be in effect. The remote computing system may then return control back to the respective user of each of the one or more sprinkler systems. The respective user of each of the one or more sprinkler systems may receive a notification via their respective user device informing them that the third party no longer has control of their sprinkler system.

With the foregoing in mind, FIG. 1 is a schematic diagram of an embodiment of a sprinkler control system 8. The sprinkler control system 8 includes a sprinkler system 10 having a sprinkler controller 12 (e.g., electronic controller), which may communicate with a user device 14 and/or a remote computing system 18 to facilitate remote user and/or third party control of the sprinkler system 10.

The sprinkler system 10 may be located in a yard or area of land associated with a property (e.g., distinct property, such as one residential or commercial lot) of a user of the sprinkler system 10. The sprinkler system 10 may include one or more sprinkler sensors 16 that are associated with sprinkler heads 15 of the sprinkler system 10. The sprinkler sensors 16 may include moisture sensors, optical sensors, chemical sensors, nutrient sensors, and/or any other sensor(s) that may detect lawn condition(s) of the property. As shown, the sprinkler sensors 16 are co-located with the sprinkler heads 15. For example, the sprinkler sensors 16 may be an internal component of the sprinkler head included at manufacture or may be attached at a later date as an external device (e.g., retrofitted; attached to an outer casing of the sprinkler head). However, it should be appreciated that the sprinkler sensors 16 may also be separate from the sprinkler heads 15. For example, the sprinkler sensors 16 may be located within a sensor housing that is placed at the property, such as near the sprinkler controller 12.

The sprinkler system 10 may also include the sprinkler controller 12 that is communicatively connected to one or more valves 20 that operate to enable water to flow from a water supply 22 through pipes installed in the lawn of the property to the one or more sprinkler heads 15. The sprinkler controller 12 may send control signals to the one or more valves 20 to control water distribution through the sprinkler system 10. More particularly, the sprinkler sensors 16 may transmit the sensor data to the sprinkler controller 12. The sprinkler controller 12 may receive the sensor data and analyze the sensor data to identify a recommended program for providing water to the property (e.g., a recommended schedule for turning on and/or shutting off the valves 20). For example, the sprinkler controller 12 may access one or more databases that store multiple programs that are appropriate for different lawn conditions, and the sprinkler controller 12 may select one of the multiple programs to be the recommended program based on the sensor data. In some embodiments, the sprinkler controller 12 may store one or more algorithms that develop (e.g., dynamically generate) the recommended program based on the sensor data. In any case, the sprinkler controller 12 may then control the valves 20 to adjust water distribution in a manner that is appropriate for the lawn conditions indicated by the sensor data.

It should be appreciated that the sprinkler controller 12 may also be connected to additional valves that control additional resources that can be distributed to the lawn via the sprinkler system 10. For example, the sprinkler controller 12 may turn on and shut off the additional valves to adjust distribution of an additional material (e.g., fertilizer) from an additional supply 26 to the lawn. In such cases, the recommended program may include the distribution of the additional material from the additional supply 26. It should also be appreciated that the sprinkler controller 12 may process the sensor data locally (e.g., using a processor of the sprinkler controller 12) and/or store the multiple programs locally (e.g., in a memory of the sprinkler controller 12); however, the sprinkler controller 12 may communicate with a remote computing system 18 (e.g., via a network 24, such as the Internet) that is configured to process the sensor data and/or store the multiple programs. For example, the remote computing system 18 may be a cloud computing system or a remote server, and the remote computing system 18 may process the sensor data, select one of the multiple programs to be the recommended program based on the sensor data, and then provide the recommended program to the sprinkler controller 12. It should also be appreciated that the lawn conditions may be derived from the sensor data and/or inputs from the user (e.g., at the sprinkler controller 12 and/or the user device 14), such as inputs from the user that indicate types of plants in the lawn and/or water requirements for the plants in the lawn.

In some embodiments, the sprinkler controller 12 may communicate with the user device 14 via the network 24, thereby establishing a local system at the property. The sprinkler controller 12 may be able to transmit signals via the network 24 to the user device 14 to communicate the sensor data, the lawn condition(s), a current program, a current status of the valves 20 (e.g., on or off), and/or other information to the user based on the sensor data received by the sprinkler controller 12. The user device 14 may also send commands to the sprinkler controller 12 via the network 24 to enable the user to control the sprinkler system 10 while the user is located remotely from the property. For example, the user may desire to turn off the valves 20 for a certain time period due to heavy storms in the area, but may not be physically present at the property to provide manual inputs directly at the sprinkler controller 12 to program the sprinkler controller 12. Thus, the user may send a command via an application of the user device 14 to the sprinkler controller 12 to close the valves 20 during the certain time period. The command may override previous settings (e.g., set by the user and/or via the recommended program) and the sprinkler controller 12 may shut off the valves 20 of the sprinkler system 10 so that the sprinkler system 10 does not distribute water to the lawn during the certain time period specified by the user.

In some embodiments, the sprinkler control system 8 may enable remote control of the sprinkler system 10 via the remote computing system 18. For example, a utility system or other third party entity (e.g., other than the user or the property owner; an insurance provider) may establish control of the sprinkler system 10 via the remote computing system 18. The remote computing system 18 may receive the sensor data from the sprinkler controller 12. The remote computing system 18 may process the sensor data, access the one or more databases, and/or utilize algorithms to identify and/or generate a recommended program for the sprinkler system 10.

The sprinkler controller 12 and/or the remote computing system 18 may also analyze environmental conditions, such as based on querying one or more weather databases and/or services for weather condition data corresponding to the geographical location of the sprinkler system 10 and/or correlating the sensor data to certain environmental conditions (e.g., rain, drought, flooding). The sprinkler controller 12 and/or the remote computing system 18 may identify and/or generate the recommend program for the sprinkler system 10 and/or otherwise send control commands to the sprinkler controller 12 to provide water consumption for the sprinkler system 10 based on the environmental conditions and/or forecasted environmental conditions. For example, if the identified weather condition data includes a storm forecast for Monday and Tuesday of the upcoming week, the remote computing system 18 may send a command to the sprinkler controller 12 to deactivate the sprinkler system 10 during Monday and Tuesday of the upcoming week.

Further, the remote computing system 18 may also establish control of one or more sprinkler systems 10 for one or more properties (e.g., distinct properties, such as distinct residential and/or commercial lots) located within a specified geographical area based on the environmental conditions of the geographical area (e.g., based on the weather data and/or the sensor data for one or more of the one or more sprinkler systems 10 within the geographical area). More particularly, the remote computing system 18 may monitor the environmental conditions of the geographical area and take over control of the one or more sprinkler systems 10 within the geographical area in response to the environmental conditions meeting certain criteria. For example, when the environmental conditions in the geographical area correspond to drought conditions (e.g., no rain for more than a threshold number of days, such as 10 days), the remote computing system 18 may gain control (e.g., automatically take control; select and/or change the recommended program) of the one or more sprinkler systems 10 within the geographical area. The remote computing system 18 may instruct output of a notification to the user device 14 to indicate to the user that the remote computing system 18 has assumed control of the sprinkler system 10. In some cases, the remote computing system 18 may gain control such that the remote computing system 18 overrides and/or blocks the user from making any changes to the recommended program (e.g., via inputs at the user device 14 and/or directly at the sprinkler controller 12). In some cases, the remote computing system 18 may gain control, but the user may still adjust the recommended program (e.g., via inputs at the user device 14 and/or directly at the sprinkler controller 12) to make any desired changes (e.g., add as much watering time as desired; water at desired times of day) and/or to make certain limited changes (e.g., add watering time up to certain limits, such as 5 extra minutes per day; change only to certain times of day). In some embodiments, the user may opt in (e.g., as part of a registration process) to enable the control via the remote computing system 18, and the third party may provide incentives (e.g., lower rates for water) in exchange.

With multiple sprinkler systems 10 in the geographical area, the remote computing system 18 may send out a command to each respective sprinkler controller 12 of the multiple sprinkler systems 10 in the geographical area. The remote computing system 18 may send the same command (e.g., the same recommended program) to each respective sprinkler controller 12 based on the environmental conditions of the geographic area, coordinated commands (e.g., complementary recommended programs) to each respective sprinkler controller 12 based on the environmental conditions of the geographic area, and/or may send different commands (e.g., individualized commands) to each respective sprinkler controller 12 based on the environmental conditions of the geographic area as well as the lawn conditions of the property.

For example, one sprinkler system 10 may contain a yard with a certain type of landscaping that benefits from more or less frequent watering than another yard in the geographical area. The remote computing system 18 may have access to the lawn conditions at each individual (e.g., distinct) property, such as via the respective sensors 16 of the respective sprinkler system 10 at the respective property and/or inputs from the user associated with the respective property. Therefore, the remote computing system 18 may communicate individualized commands to each of the one or more sprinkler systems 10 depending on a combination of the environmental conditions and the sensor data/inputs for each of the one or more sprinkler systems 10. The remote computing system 18 may utilize one or more databases to access local watering restrictions (which may change over time, such as based on the environmental conditions) to ensure that each sprinkler watering schedule corresponds to local watering restrictions. The remote computing system 18 may also receive feedback related to the watering, such as by monitoring moisture conditions in each individual yard via the sensor data. This enables the remote computing system 18 to consider multiple factors, such as the local watering restrictions, the environmental conditions, and the lawn conditions (including changes to the lawn conditions during watering).

The remote computing system 18 may also detect when the environmental conditions return to a moderate condition or a threshold control condition, and the remote computing system 18 may then return control of the one or sprinkler systems 10 to the user(s). Each user may receive a notification on their user device 14 via the network 24 that the remote computing system 18 has released control and/or that the user has regained control of the sprinkler system 10. The user may receive a text notification, a voice notification, and/or another type of notification via the user device 14. While certain operations are described herein as being carried out by the sprinkler controller 12 and other operations are described herein as being carried out by the remote computing system 18, it should be appreciated that any of the operations described herein may be carried out by the sprinkler controller 12, the user device 14, and/or the remote computing system 18.

Figure 2:
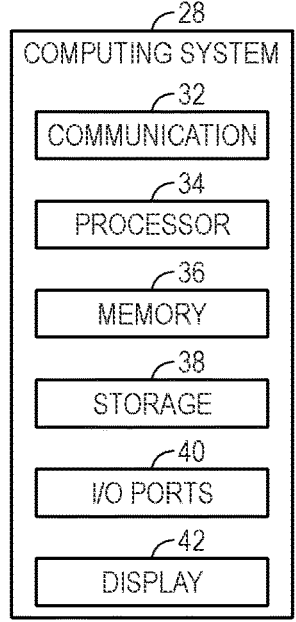
FIG. 2 illustrates a block diagram of a computing system that may be used in the sprinkler control system of FIG. 1, in accordance with an embodiment of the present disclosure.

The remote computing system 18 may include a computing system 28, as detailed in FIG. 2. It should be appreciated the sprinkler controller 12 and/or the user device 14 may include the same or similar components. The computing system 28 may include any suitable computer device, such as a general-purpose personal computer, a laptop computer, a tablet computer, a mobile computer, or the like that is configured in accordance with present embodiments. The computing system 28 may include various types of components that may assist the computing system 28 in performing various types of tasks and operations described herein. For example, the computing system 28 may include a communication component 32, a processor 34, a memory 36, a storage 38, input/output (I/O) ports 40, a display 42, and the like. The communication component 32 may be a wireless or wired communication component that may facilitate communication between the computing system 28, the data sources, and various other computing systems via a network, the Internet, or the like. The processor 34 may be any type of computer processor or microprocessor capable of executing computer-executable code. The processor 34 may also include multiple processors that may perform the operations described below.

The memory 36 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. As used herein, applications may include any suitable computer software or program that may be installed onto the computing system 28 and executed by the processor 34. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components, such as input devices (e.g., keyboard, mouse), sensors, input/output (I/O) modules, and the like. The display 42 may operate as a human machine interface (HMI) to depict visualizations associated with software or executable code being processed by the processor 34. In one embodiment, the display 42 may be a touch display capable of receiving inputs from a user of the computing system 28. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the computing system 28. It should be noted that the components described above with regard to the computing system 28 are examples and the computing system 28 may include additional or fewer components relative to the illustrated embodiment.

In certain embodiments, the computing system 28 may be communicatively coupled to a network, which may include collections of computing systems, the Internet, an Intranet system, or the like. The network may facilitate communication between the computing system 28 and various other data sources. For instance, the network may be communicatively coupled to a mobile device (e.g., the user device 14) and/or sprinkler controller 12 to enable notifications to the user and/or control of water supply to the sprinklers of the property. In some embodiments, the network may be communicatively coupled to one or more databases, which may store data regarding lawn conditions, such as yard landscaping, yard conditions, environmental conditions, or any other yard maintenance data. In addition, the one or more databases may include an exposed application programming interface (API) that provides data services regarding property conditions and property claim comparisons. The one or more databases may conduct ongoing updates to add additional property condition data to the one or more databases. The one or more databases may be utilized for sprinkler control, as referenced in FIG. 3.

Figure 3:
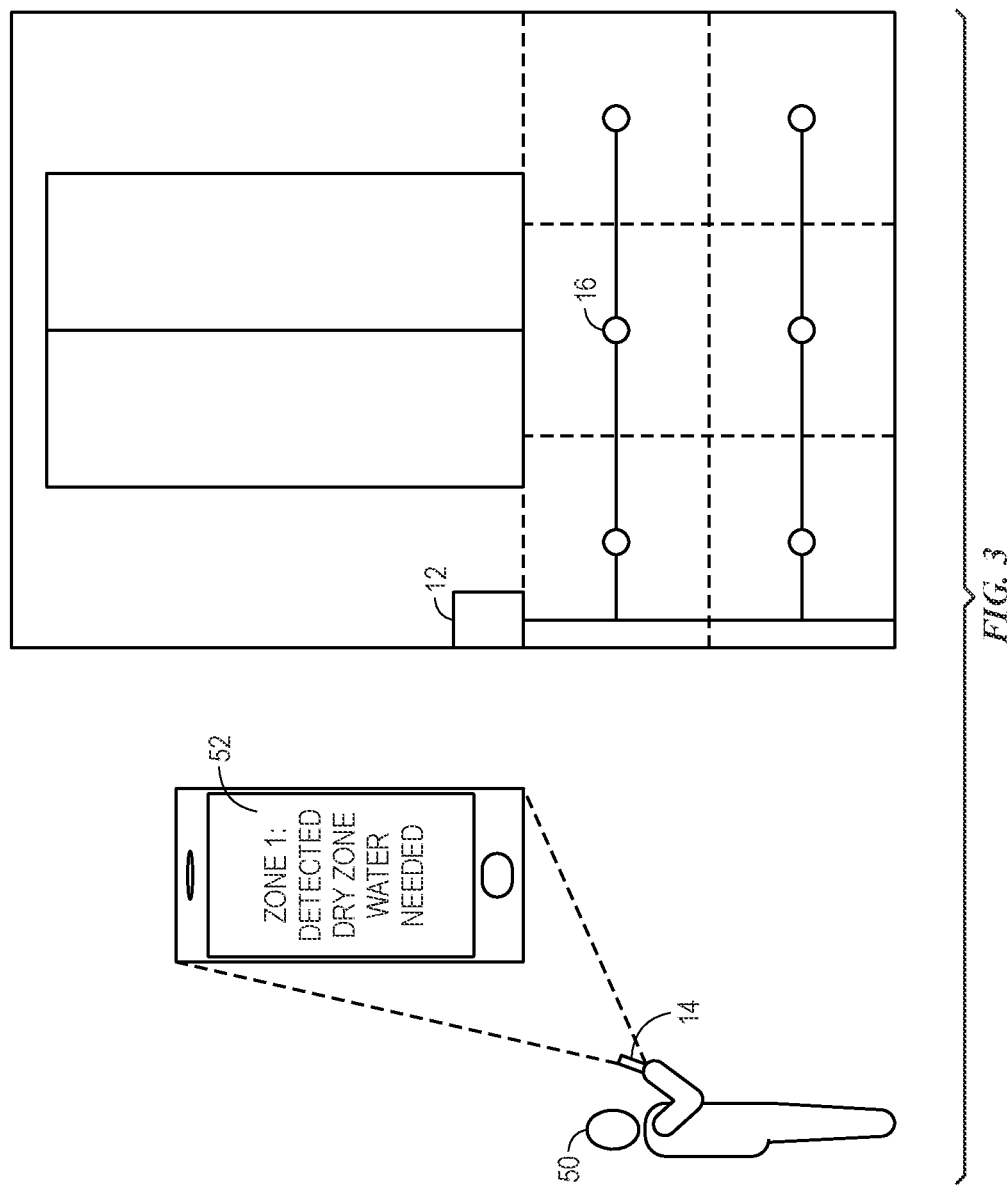
FIG. 3 illustrates a user interaction with a sprinkler system of the sprinkler control system of FIG. 1, in accordance with an embodiment of the present disclosure.

With reference to FIG. 3, the sprinkler controller 12 may send the sensor data obtained from one or more sprinkler sensors 16 of the sprinkler system 10 to a user 50 of the sprinkler system 10, such as via the user device 14. As mentioned above, the one or more sprinkler sensors 16 may be externally attached or internal to the sprinkler heads dispersed throughout the yard of the user 50. The yard of the user 50 may be divided into zones that include certain portions of the yard. The zones may each contain one or more sprinkler heads that include sprinkler sensors 16. The zones may be determined based on valve location and/or areas of the yard that correspond to a respective valve that is controlled by the sprinkler controller 12. The different zones of the yard may be watered by the sprinklers at different times and/or different frequencies (e.g., depending on the lawn conditions within the different zones). For example, the sensor data received by the sprinkler controller 12 via the sprinkler sensors 16 may contain moisture data for each zone of the yard. The sprinkler controller 12 may process the moisture data and/or communicate the moisture data (e.g., to the user device 14 or the remote computing system 18 of FIG. 1). Regardless of where the moisture data is processed, dry zones may be identified and a software application on the user device 14 may display a notification 52 to the user that indicates that specific zones of the yard are categorized as dry zones due to the moisture data indicating that a moisture level is below a threshold moisture value for the corresponding zone. Then, automatically upon detection of low moisture in specific zones of the yard, commands may be sent to the sprinkler controller 12 to open the valves 20 for the specific zones of the yard so that water is directed to the dry zones and the areas of the yard categorized as dry zones based on the sensor data. In some cases, the sensor data is received and processed (e.g., in substantially real-time; within seconds; continuously), and then the commands are immediately (e.g., in substantially real-time; within seconds) sent to the sprinkler controller 12 to dynamically and responsively adjust the valves 20 over time.

As noted herein, the sprinkler controller 12 may also be configured to analyze the sensor data independently of communication with another device. The sprinkler controller 12 may be able to detect that a specific zone's sensor data is below a threshold sensor value and send a command that the valves 20 for the corresponding zones be opened so that those zones can receive water via the sprinkler heads of the sprinkler system 10. The sprinkler controller 12 may also activate dispensing systems corresponding to additional supplies that may include fertilizer or nutrients that may be distributed through the sprinkler system 10 to the lawn to aid in lawn care in response to a nutrient sensor or another sensor indicating that other lawn maintenance besides water would be beneficial.

In some embodiments, the user 50 may take a picture of the yard using a camera, such as a camera of the user device 14. The user 50 may upload the picture to a software application of the user device 14, and the picture may be analyzed to determine the lawn condition using image data extracted from the picture (e.g., via image analysis techniques) and to detect the areas of the yard that would benefit from more water, fertilizer, and/or other treatment. For example, the picture may be analyzed to identify types of plants, which may then be used to identify water requirements for the plants in the yard. As another example, the picture may be analyzed to identify drooping limbs, wilted leaves, standing water in the yard, or the like. These lawn conditions may then be used to determine the recommended watering program for the yard. The sprinkler controller 12 may receive commands and then distribute the appropriate supply to the appropriate zone of the yard. It should be appreciated that the sprinkler controller 12 may also receive the data from any other camera or imaging device, such as a security camera mounted outside of a residence and pointed at the yard, an aerial drone that is programmed to periodically fly over the yard to capture the image data, and/or an autonomous vehicle that is programmed to periodically travel around the yard to capture the image data. Indeed, the camera(s) and/or the imaging device(s) may be communicatively coupled to the sprinkler controller 12 and/or controlled by the sprinkler controller 12 to move and/or to provide the image data according to a desired schedule (e.g., periodically, after a certain number of days without rain, after a rain event).

Figure 4:
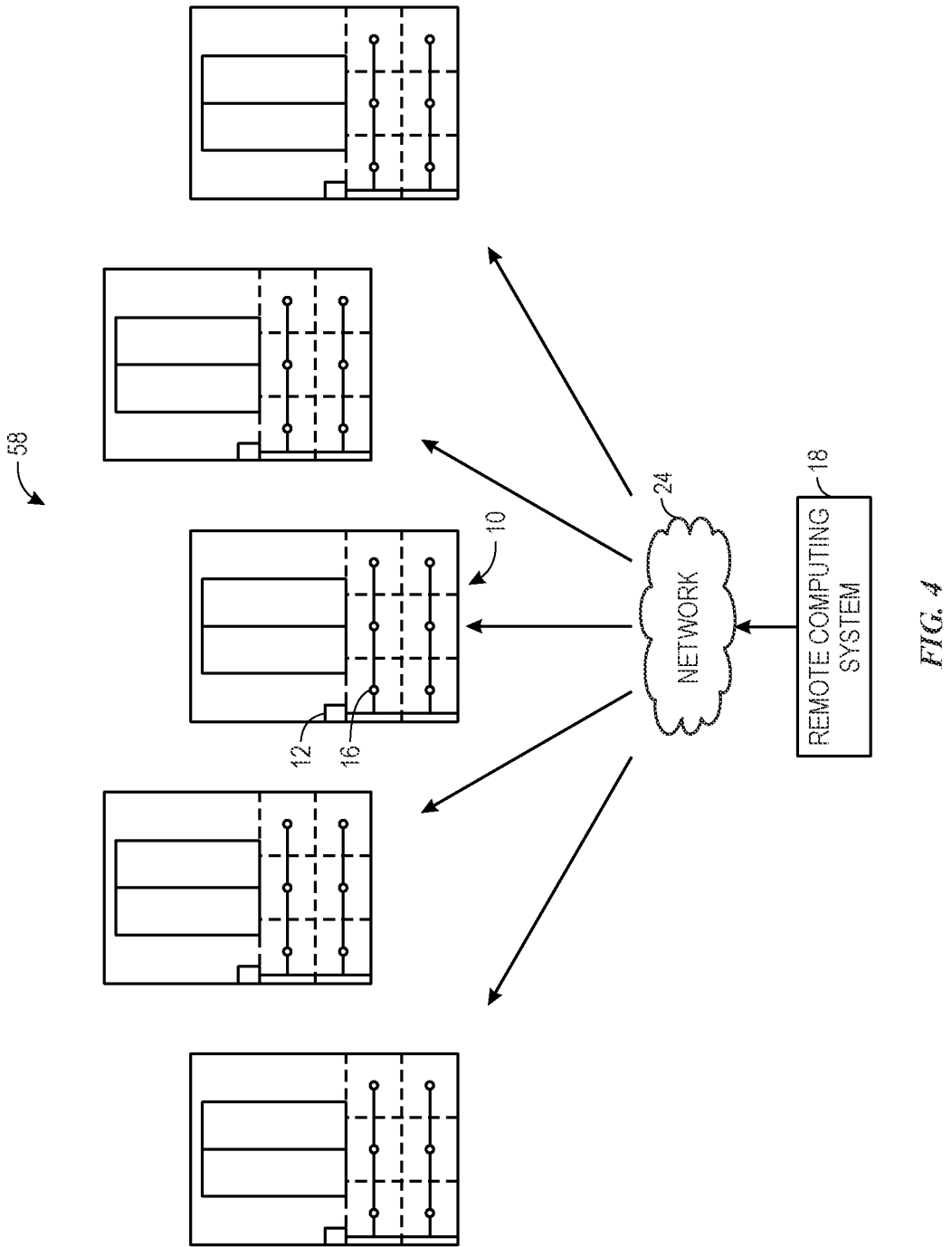
FIG. 4 illustrates a third party sprinkler control system that may be used to control multiple sprinkler systems, in accordance with an embodiment of the present disclosure.

With the forgoing in mind, FIG. 4 illustrates a third party sprinkler control system 58 that may be used to control one or more sprinkler systems 10 associated with a geographical area, in accordance with an embodiment of the disclosure. The remote computing system 18 may be configured to coordinate the control of multiple sprinkler systems 10 within the geographical area, or even across multiple geographical areas. For example, under certain environmental conditions, a utility system provider (or any other third party entity, such as an insurance provider) may take control of the multiple sprinkler systems 10 corresponding to certain geographical areas to preserve water during drought conditions. The utility company may offer a discount or incentive for the user 50 of the sprinkler system 10 to approve the utility company (e.g., via the remote computing system 18) to take over control of their sprinkler system 10 during certain environmental conditions (e.g. drought, rain storm). For example, the utility company may offer the user a discounted rate in response to the user accepting an agreement to turn over control of the sprinkler system 10 to the utility company during certain environmental conditions. In some cases, the utility company may provide different incentives, such as a first incentive (e.g., first level or rate reduction) for the user 50 of the sprinkler system 10 in response to approval for the utility company to take over control without allowing the user to override or adjust the recommended program set by the utility company, and a second incentive (e.g., second level or rate reduction, lower) for the user 50 of the sprinkler system 10 in response to approval for the utility company to take over control with options for the user to override or adjust the recommended program set by the utility company.

The utility company may utilize the remote computing system 18 to transmit sprinkler control commands, including restricted watering times, to each sprinkler controller 12 of each sprinkler system 10 in the geographical area. The utility company may receive indications from multiple users in the geographical area to opt in to turning over control of their respective sprinkler system 10 during certain environmental conditions and corresponding customer identification data. The utility company may utilize the customer identification data to determine the customer property location and the associated sprinkler system 10 utilizing a utility database that includes customer information, customer location, and the like.

As mentioned above, the remote computing system 18 may detect an environmental condition that corresponds to a threshold condition for utility system control in a geographical area. The remote computing system 18 may then query one or more databases that include customer identification data to identify sprinkler systems 10 in the geographical area that have approved utility system control during certain environmental conditions and/or the remote computing system 18 may generate a notification that is sent to various user devices of users associated with the properties in the geographical area. The remote computing system 18 may then (e.g., in response to approval; only with the approval) transmit control instructions to the one or more sprinkler controllers 12 (e.g., that have the approval; only the sprinkler controllers 12 with the approval) to restrict sprinkler activation according to the environmental condition.

The remote computing system 18 may receive the sensor data (e.g., via respective sprinkler controllers 12), including the image data (e.g., captured by the camera(s) and/or the imaging device(s)). It should be appreciated that the remote computing system 18 may periodically and/or continuously receive the sensor data, including the image data. Further, the remote computing system 18 may send a request and/or control signals to initiate collection and/or transfer of the sensor data, including the image data, to the remote computing system 18. In certain embodiments, the remote computing system 18 may control the camera(s) and/or the imaging device(s) to capture the image data, such as by instructing the aerial drone(s) and/or the autonomous vehicle(s) to travel to around the geographical area to capture the image data of different distinct properties in the geographical area periodically, continuously, and/or in response to certain environmental conditions (e.g., after a certain number of days without rain; after a rain event).

The remote computing system 18 may determine at a later time that the environmental condition for the geographical area no longer corresponds to a threshold condition for utility system control of the one or more sprinkler systems 10. The remote computing system 18 may transmit a notification to one or more user devices 14 corresponding to the one or more sprinkler systems 10 in the geographical area that approved user control. The notification may indicate that control has been returned to the user of the sprinkler system 10. This method of third party control of sprinkler systems 10 based on certain environmental conditions is further explained with reference to FIG. 5.

Turning now to FIG. 5, which depicts a flow diagram of an embodiment of a method of controlling one or more sprinkler systems. The method includes various steps represented by blocks. It should be noted that the method may be performed as an automated procedure by a system, such as the remote computing system 18. Although the flow chart illustrates the steps in a certain sequence, it should be understood that the steps may be performed in any suitable order and certain steps may be carried out simultaneously, where appropriate. Further, certain steps or portions of the method may be performed by separate systems or devices. A user of a utility system may opt into a program that allows the utility system to control the sprinkler system 10 of the user during certain environmental conditions.

The method depicted in FIG. 5 can be performed by any third party entity including organizations, utility companies, insurance providers, environmental groups, or the like using a computing system, such as the remote computing system 18. The computing system may, at block 60, detect a change in environmental conditions in an area. The computing system may compare the environmental conditions to a threshold value to determine that the environmental conditions qualify or indicate that the computing system should assume control of the sprinkler systems 10 in the area. The computing system may, at block 62, identify one or more sprinkler systems 10 in the area, such as by querying one or more databases that include customer information for the corresponding sprinkler systems 10 in the area. The computing system may then determine (e.g., identify) the sprinkler systems 10 in the area that are "opted in" to allow third party control during the environmental conditions (e.g., the current environmental conditions that are identified in block 60), by utilizing the customer information.

Once the computing system has identified the customers that approved the third-party control, the computing system, at block 64, identifies recommended program(s) based on the environmental conditions (and/or other factors, as described herein) and transmits control instructions to control sprinkler activation according to the recommended program(s) to the sprinkler systems 10 of the identified customers. For example, during a drought condition the computing system may transmit a command to the one or more sprinkler controllers 12 of the sprinkler systems 10 of the identified customers in the area having the environmental condition to activate the one or more sprinkler systems 10 during certain hours and/or for certain days of the week. The computing system may determine the recommend program(s) (e.g., the watering schedule) to be sent to the one or more sprinkler systems 10 based upon querying one or more databases that include multiple programs (e.g., multiple watering schedules) for a variety of environmental conditions. As noted herein, the computing system may send the same command (e.g., the same recommended program) to each respective sprinkler controller 12 based on the environmental conditions of the area, coordinated commands (e.g., complementary recommended programs) to each respective sprinkler controller 12 based on the environmental conditions of the area, and/or may send different commands (e.g., individualized commands) to each respective sprinkler controller 12 based on the environmental conditions of the area as well as the lawn conditions of the property (e.g., the distinct property). The coordinated commands may include a first command to instruct a first set of sprinkler systems 10 to operate the first set of sprinkler systems 10 according to a first recommended program and a second command to instruct a second set of sprinkler systems 10 to operate the second set of sprinkler systems 10 according to a second recommended program. In such cases, the first recommended program and the second recommended program may turn on the sprinklers for different lengths of time, different times of days, and/or different days of the week (e.g., alternating times, non-overlapping times). Advantageously, this may provide for water conservation over time and/or provide for even usage of water over time (e.g., substantially even usage; avoid spikes in usage).

The computing system, at a later time, may determine that the environmental condition for the area does not meet the threshold value and may return control to the identified customers of the one or more sprinkler systems 10. The computing system, at block 66, sends a notification to the one or more user devices 14 associated with the identified customers in the area. The notification may include an indication that the customer has regained control of the sprinkler system 10 due to the environmental conditions in the area dropping below the threshold value.

While certain examples relate to authorization from the user (e.g., property owner) to enable a third-party entity to assume control of the sprinkler system(s) 10, it should be appreciated that the authorization or approval may come from any user or entity (e.g., local government entity). Further, while certain examples relate to a utility company having control of the sprinkler system(s) 10, it should be appreciated that an insurance provider (e.g., for the property) may obtain control of the sprinkler system(s) 10. For example, the insurance provider may obtain control of the sprinkler system(s) 10 to maintain appropriate moisture around a respective foundation of the property, reduce flooding or water damage to structures on the property, or the like. The insurance provider may provide a discounted rate (e.g., premium) and/or other incentives for the user(s) 50 of the sprinkler system(s) 10 to provide approval for the insurance provider to assume control of the sprinkler system(s) 10. In some embodiments, the insurance provider may provide a temporary reward (e.g., cash back) to an owner of the property each time the insurance provider assumes control of the sprinkler system 10 at the property and/or each time the insurance provider turns the sprinkler system 10 on during a drought (e.g., to water the foundation of the property; so as to offset a price paid by the owner to the utility company for water).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure. It should be appreciated that features discussed with references to different examples provided herein may be combined. Features shown and described with reference to FIGS. 1-5 may be combined in any suitable manner.

The invention claimed is:

1. A system, comprising:
a computing system comprising one or more processors; and
memory storing instructions executable by the computing system to cause the computing system to:
determine a change in an environmental condition for a first area, a second area, or both based on sensor data;
identify a first plurality of distinct sprinkler systems associated with a first plurality of distinct properties in the first area, wherein the first plurality of distinct sprinkler systems comprises a first set of sensors configured to generate first sensor data of the sensor data;
identify a second plurality of distinct sprinkler systems associated with a second plurality of distinct properties in the second area, wherein the second plurality of distinct sprinkler systems comprises a second set of sensors configured to generate second sensor data of the sensor data;
in response to determining that the change in the environmental condition meets or exceeds a threshold, send a notification to respective user devices associated with the first and second plurality of distinct sprinkler systems, wherein the notification comprises a request for approval to adjust at least one respective sprinkler system of the first and second plurality of distinct sprinkler systems;
in response to receipt of respective user inputs indicative of the approval and during a time period, transmit coordinated control instructions to the first and second plurality of distinct sprinkler systems based on a respective geographic location of each distinct sprinkler system of the first and second plurality of distinct sprinkler systems and the sensor data, wherein the coordinated control instructions comprise a first command to instruct respective distinct controllers of the first plurality of distinct sprinkler systems to adjust a first plurality of sprinkler valves according to a first recommended program and a second command to instruct respective distinct controllers of the second plurality of sprinkler systems to adjust a second plurality of sprinkler valves according to a second recommended program; and
during the time period, override additional respective user inputs provided to the respective distinct controllers of the first and second plurality of distinct sprinkler systems to block respective users from making changes to the first recommended program and the second recommended program.

2. The system of claim 1, wherein the instructions are executable by the computing system to cause the computing system to provide respective discounted insurance premiums for the first and second plurality of distinct properties in response to receipt of the respective user inputs indicative of the approval.

3. The system of claim 1, wherein the first sensor data comprises moisture data, optical data, chemical data, nutrient data, or any combination thereof.

4. The system of claim 1, wherein the instructions are executable by the computing system to cause the computing system to determine the first recommended program based on the first sensor data and the change in the environmental conditions.

5. The system of claim 1, wherein the instructions are executable by the computing system to cause the computing system to identify the first plurality of distinct sprinkler systems associated with the first plurality of distinct properties and the second plurality of distinct sprinkler systems associated with the second plurality of distinct properties based on one or more databases that comprise user information corresponding to the first and second plurality of distinct sprinkler systems.

6. The system of claim 1, wherein the first command instructs the respective distinct controllers of the first plurality of distinct sprinkler systems to open the first plurality of sprinkler valves for a first portion of the time period, and the second command instructs the respective distinct controllers of the second plurality of distinct sprinkler systems to open the second plurality of sprinkler valves for a second portion of the time period.

7. The system of claim 6, wherein the first portion of the time period and the second portion of the time period do not overlap with one another, comprise different lengths of time, or both.

8. The system of claim 6, wherein execution of the first recommended program and the second recommended program during the time period is configured to provide even usage of water during the time period.

9. The system of claim 1, wherein the instructions are executable by the computing system to cause the computing system to provide an additional notification to the respective user devices, wherein the additional notification indicates a schedule of operation of the first and second plurality of distinct sprinkler systems to be implemented via the coordinated control instructions.

10. A method, comprising:
receiving, at one or more processors, sensor data from one or more sensors, wherein the sensor data corresponds to an environmental condition in a first area, a second area, or both;
determining, via the one or more processors, the environmental condition in the first area, the second area, or both based on the sensor data;
identifying, via the one or more processors, a first plurality of distinct sprinkler systems for a first plurality of distinct properties in the first area, wherein the first plurality of distinct sprinkler systems comprises a first set of sensors configured to generate first sensor data of the sensor data;
identifying, via the one or more processors, a second plurality of distinct sprinkler systems associated with a second plurality of distinct properties in the second area, wherein the second plurality of distinct sprinkler systems comprises a second set of sensors configured to generate second sensor data of the sensor data;
sending, via the one or more processors, a notification to respective user devices associated with the first and second plurality of distinct sprinkler systems based on the environmental condition in the first area, the second area, or both, wherein the notification comprises a request for approval to adjust at least one respective sprinkler system of the first and second plurality of distinct sprinkler systems;
determining, in response to receipt of the approval and via the one or more processors, coordinated control instructions for the first and second plurality of distinct sprinkler systems based on the environmental condition in the first area, the second area, or both;
transmitting, in response to receipt of the approval and determining the coordinated control instructions, and during a time period and via a transmitter, the coordinated control instructions to the first and second plurality of distinct sprinkler systems based on a respective geographic location of each distinct sprinkler system of the first and second plurality of distinct sprinkler systems and the sensor data, wherein the coordinated control instructions comprise a first command to instruct respective distinct controllers of the first plurality of distinct sprinkler systems to adjust a first plurality of sprinkler valves according to a first recommended program and a second command to instruct respective distinct controllers of the second plurality of sprinkler systems to adjust a second plurality of sprinkler valves according to a second recommended program; and;

overriding, during the time period and via the one or more processors, respective user inputs provided to the respective distinct controllers of the first and second plurality of distinct sprinkler systems to block respective users from making changes to the first recommended program and the second recommended program; and transmitting, via the transmitter, an additional notification to the respective user devices associated with the first and second plurality of distinct sprinkler systems.

11. The method of claim 10, wherein the additional notification indicates that an entity has assumed control of the first and second plurality of distinct sprinkler systems.

12. The method of claim 11, wherein the entity comprises a utility company, an insurance provider, an environmental group, or any combination thereof.

13. The method of claim 12, wherein identifying, via the one or more processors, the first and second plurality of distinct sprinkler systems for the plurality of distinct properties in the first area, the second area, or both comprises:

querying a database and identifying the first plurality of distinct sprinkler systems for the first plurality of distinct properties and the second plurality of distinct sprinkler systems for the second plurality of distinct properties based on prior user approval for sprinkler control by the entity.

14. The method of claim 13, comprising updating, via the one or more processors, the database based on the coordinated control instructions sent to the first and second plurality of distinct sprinkler systems.

15. The method of claim 11, wherein determining the coordinated control instructions comprises:

accessing, via the one or more processors, one or more databases that store multiple programs that correspond to one or more sample environmental conditions;

matching, via the one or more processors, the environmental condition to a matching one of the one or more sample environmental conditions; and selecting, via the one or more processors, the first recommended program and the second recommended program from the multiple programs, wherein the first recommended program and the second recommended program correspond to the matching one of the one or more sample environmental conditions.

16. The method of claim 11, wherein the sensor data comprises moisture data, optical data, chemical data, nutrient data, or any combination thereof.

17. The method of claim 11, comprising:

receiving, at the one or more processors, weather data from a weather service, wherein the weather data is indicative of the environmental condition in the first area, the second area, or both; and determining, via the one or more processors, the environmental condition in the first area, the second area, or both based on the sensor data and the weather data.

18. A system, comprising:

a computing system comprising one or more processors; and memory storing instructions executable by the computing system to cause the computing system to:

receive first sensor data from one or more first sensors associated with a first sprinkler system at a first property, second sensor data from one or more second sensors associated with a second sprinkler system at a second property, or both;

determine that one or more first sprinkler valves of the first sprinkler system at the first property and one or more second sprinkler valves of the second sprinkler system at the second property should be adjusted based on the first sensor data, the second sensor data, or both;

send a notification to a user device associated with the first sprinkler system in response to determining that the one or more first sprinkler valves of the first sprinkler system at the first property should be adjusted, wherein the notification comprises a request for approval to adjust the one or more first sprinkler valves;

receive approval from the user device to adjust the one or more first sprinkler valves;

in response to receipt of the approval and during a time period, send a coordinated control signal to adjust the one or more first sprinkler valves and the one or more second sprinkler valves, wherein the coordinated control signal comprises a first command to instruct a first controller of the first sprinkler system to adjust the one or more first sprinkler valves according to a first recommended program and a second command to instruct a second controller of the second sprinkler system to adjust the one or more second sprinkler valves according to a second recommended program; and during the time period, override user inputs provided to the first controller and the second controller to block users from making changes to performance of the first recommended program and the second recommended program.

19. The system of claim 18, wherein the instructions are executable by the computing system to cause the computing system to adjust an insurance premium for the first property in response to receipt of the approval.

20. The system of claim 18, wherein the sensor data comprises moisture data, optical data, chemical data, nutrient data, or any combination thereof.

* * * * *